(12) United States Patent
Shibata et al.

(10) Patent No.: US 6,521,848 B2
(45) Date of Patent: Feb. 18, 2003

(54) OPERATION SWITCH UNIT FOR VEHICLE

(75) Inventors: Tomoyuki Shibata, Aichi (JP); Kazuyoshi Ishiguro, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 09/989,665

(22) Filed: Nov. 21, 2001

(65) Prior Publication Data
US 2002/0063046 A1 May 30, 2002

(30) Foreign Application Priority Data
Nov. 30, 2000 (JP) ..................................... P2000-365218

(51) Int. Cl.[7] .............................................. H01H 9/00
(52) U.S. Cl. .......................... 200/5 R; 200/11 R; 200/18
(58) Field of Search ............................. 200/4, 5 R, 5 A, 200/11 R, 18, 293, 296, 564, 565, 567, 329, 314, 313, 308, 311; 74/10.41, 527

(56) References Cited

U.S. PATENT DOCUMENTS

| | | | | |
|---|---|---|---|---|
| 5,861,589 A | * | 1/1999 | Sato et al. .................. | 200/5 R |
| 5,892,192 A | * | 4/1999 | Ishiguro et al. ............. | 200/5 R |
| 6,207,913 B1 | * | 3/2001 | Nakajima et al. ........... | 200/314 |
| 6,223,610 B1 | * | 5/2001 | Ishiguro et al. ............ | 74/10.41 |
| 6,281,453 B1 | * | 8/2001 | Uleski ......................... | 200/4 |

* cited by examiner

*Primary Examiner*—Elvin Enad
*Assistant Examiner*—Kyung Lee
(74) *Attorney, Agent, or Firm*—Morgan, Lewis & Bockius LLP

(57) ABSTRACT

A rotary body (20) rotating around a shaft center (O1) is provided at a main case body (13). A cam (20*h*) is provided at the outer periphery of the potion (20*g*) of the rotary body (20). A supporting shaft (30) is provided at the main case body (13) and a cam driving force transmission rod (31) is rotatably supported by the supporting shaft (30). When the cam abutment portion (31*a*) of the cam driving force transmission rod (31) abuts against the cam (20*h*), the pressing portion (31*b*) of the cam driving force transmission rod (31) pushes an interlock member (36) to turn on a switch. A virtual circle (K) is a moving locus of the outermost portion of a cable operation member which swings around a guide tube (18), and the cam (20*h*) is disposed within the virtual circle (K).

4 Claims, 12 Drawing Sheets

OPERATION SWITCH UNIT FOR VEHICLE

BACKGROUND OF THE INVENTION

The present invention relates to an operation switch unit for a vehicle.

Generally, an operation switch unit for a vehicle (hereinafter, called a controller unit) is provided within a vehicle.

There is a controller unit shown in FIGS. 14 to 16 as such a controller unit.

The controller unit 71 includes a main case body 72 which one side surface is opened. A design plate 73 is attached to the opening portion on the one side of the main case body 72. Knob attachment holes 73a, 73b, 73c are formed at the design plate 73. Guide tubes 74, 75, 76 for rotating knobs are provided at a wall portion 72a on the other side of the main case body 72 so as to protrude forwardly and backwardly from the wall portion 72a.

The rotation shafts 77a, 78a, 79a of the rotation knobs 77, 78, 79 are rotatably supported within the guide tubes 74 to 76, respectively. Pinions 77b, 79b are provided at the tip ends of the rotation shafts 77a, 79a, respectively. The rotation knobs 77 to 79 are disposed within the knob attachment holes 73a to 73c of the design plate 73.

Guide tubes 80, 81 having shaft centers located at different positions from the shaft centers of the tubular guide bodies 74, 76 are provided at the wall 72a so as to protrude forwardly and backwardly from the wall portion 72a, respectively. Bearing shafts 82a, 83a provided at the lower portions of cable operation members 82, 83 are inserted and passed within the guide tubes 80, 81 so as to be rotatable so that the cable operation members 82, 83 can swing.

Sector gear portions 82b, 83b rotatable around the bearing shafts 82a, 83a, respectively, are provided in recess shapes at portions opposing to the pinions 77b, 79b in the cable operation members 82, 83 in such a manner that the pinions 77b, 79b are engaged with the sector gear portions 82b, 83b, respectively. The cable operation members 82, 83 are provided with cable attachment portions 82c, 83c, respectively. Power transmission cables 84, 85 are attached to the cable attachment portions 82c, 83c, respectively.

When the rotation knobs 77 to 79 are rotated forwardly and reversely, the cable operation members 82, 83 are swung reciprocally in accordance with the forward and reverse rotation of the rotation knobs 77, 79, respectively, so that the power transmission cables 84, 85 move forward and backward and processing is performed by devices other than the controller unit 71 according to the forward and backward movement thereof.

A cam 82d for setting defogging of the window glass of a vehicle and a cam 82e for canceling an inner air circulation mode are formed at portions above the cable attachment portion 82c.

A switch box 72b is integrally provided at the upper portion of the main case body 72. An operation button 72c for determining whether outside air is taken into the vehicle or not is provided at the forward portion of the switch box 72b. The operation button 72c is configured in such a manner that the backward movement state of the operation button is maintained when this button is pushed once and an circulation mode is changed in the inner air circulation mode. When the operation button is pushed again, this button moves forward and restored again and the circulation mode is changed in an external air circulation mode.

As shown in FIGS. 16A and 16B, in the switch box 72b, members 86, 87 are formed protrusively so as to be able to move forward and backward (upward and downward in drawing) with respect to the switch box 72b on moving loci of the cams 82d, 82e of the cable operation member 82, respectively.

When the cable operation member 82 reciprocally swings and the member 86 pushed by the cam 82d moves backward within the switch box 72b, the window glass of the vehicle is defogged. In the state where the operation button 72c maintains the backward movement sate (that is, the inner air circulation mode), when the cable operation member 82 reciprocally swings and the operated member 87 pushed by the cam 82e moves backward within the switch box 72b, the operation button 72c moves forward and restored again and the circulation mode is changed in the external air circulation mode.

However, in the cable operation member 82, the cams 82d, 82e are formed above the cable attachment portion 82c. Thus, the size of the cable operation member 82 becomes larger and the movable space of the cable operation member 82 at the time of swinging the cable operation member 82 becomes larger by a protruding size of the cams 82d, 82e. As a result, there arises a problem that the controller unit 71 at which the cable operation member 82 is attached becomes larger.

SUMMARY OF THE INVENTION

Accordingly, the invention has been made in view of the aforesaid conventional circumference, and an object of the invention is to provide an operation switch unit for a vehicle which can make the movable space of a cam smaller as compared with a case where the cam is provided at a portion outside of the outer frame of a cable operation member and can make the size of the operation switch unit for a vehicle smaller by a size of the movable space of the cam being made smaller.

In order to attain the aforesaid object, according to the present invention, there is provided an operation switch unit for a vehicle includes an operation knob rotatable around a first rotation shaft center;

a first cam which rotates around the first rotation shaft center, and rotates in accordance with a rotation amount of the operation knob to operate an operated member;

a pinion which rotates around the first rotation shaft center and rotates in accordance with a rotation amount of the operation knob;

a cable operation member which reciprocally swings around a second rotation shaft center which is disposed at a position different from the first rotation shaft center; and a sector gear which is provided at the cable operation member and meshes with the pinion, wherein when the cable operation member is rotated around the second rotation shaft center, a circle drawn by a portion of the cable operation member most away from the second shaft center is supposed to be a virtual circle, and the first cam is disposed within the virtual circle.

In the above arrangement of the present invention, the operation switch unit for a vehicle may further include a second cam which rotates around the first rotation shaft center, and rotates in accordance with a rotation amount of the operation knob to operate an operated member, and wherein the second cam is disposed within the virtual circle.

In the above arrangement of the present invention, the operated member operated by the first cam is a first switch for setting a defogging operation for a window glass of the vehicle, and the first cam is operated to turn on and off the first switch.

In the above arrangement of the present invention, the operated member operated by the second cam is a second switch for switching between an inner air circulation mode for circulating inner air within the vehicle and an external air introduction mode for taking external air within the vehicle, and the second cam switches the second switch in an inner air circulation mode setting state into the external air introduction mode.

Thus, according to the invention, the first cam and the pinion are rotated around the first rotation shaft center when the operation knob is rotated. When the operation knob is rotated by a predetermined rotation amount, the cam operates the operated member. Further, when the pinion is rotated, the cable operation member swings reciprocally. Since the first cam is disposed within the virtual circle, the movable space of the first cam can be made smaller as compared with the case where the first cam is provided at the outside of the outer frame of the cable operation member, for example.

Further, since the second cam is disposed within the virtual circle, the movable space of the second cam can be made smaller as compared with the case where the second cam is provided at the outside of the outer frame of the cable operation member, for example.

Further, the first cam is operated to turn on and off the first switch, and hence the defogging setting operation of the window glass of a vehicle can he performed.

Further, the second cam can switch the second switch in the inner air circulation mode setting state into the external air introduction mode.

DETAILED DESCRIPTION OF THE PREFERRED EMBODIMENTS

First Embodiment

The embodiment of the invention will be explained with reference to FIGS. 1 to 13.

Figure 2:
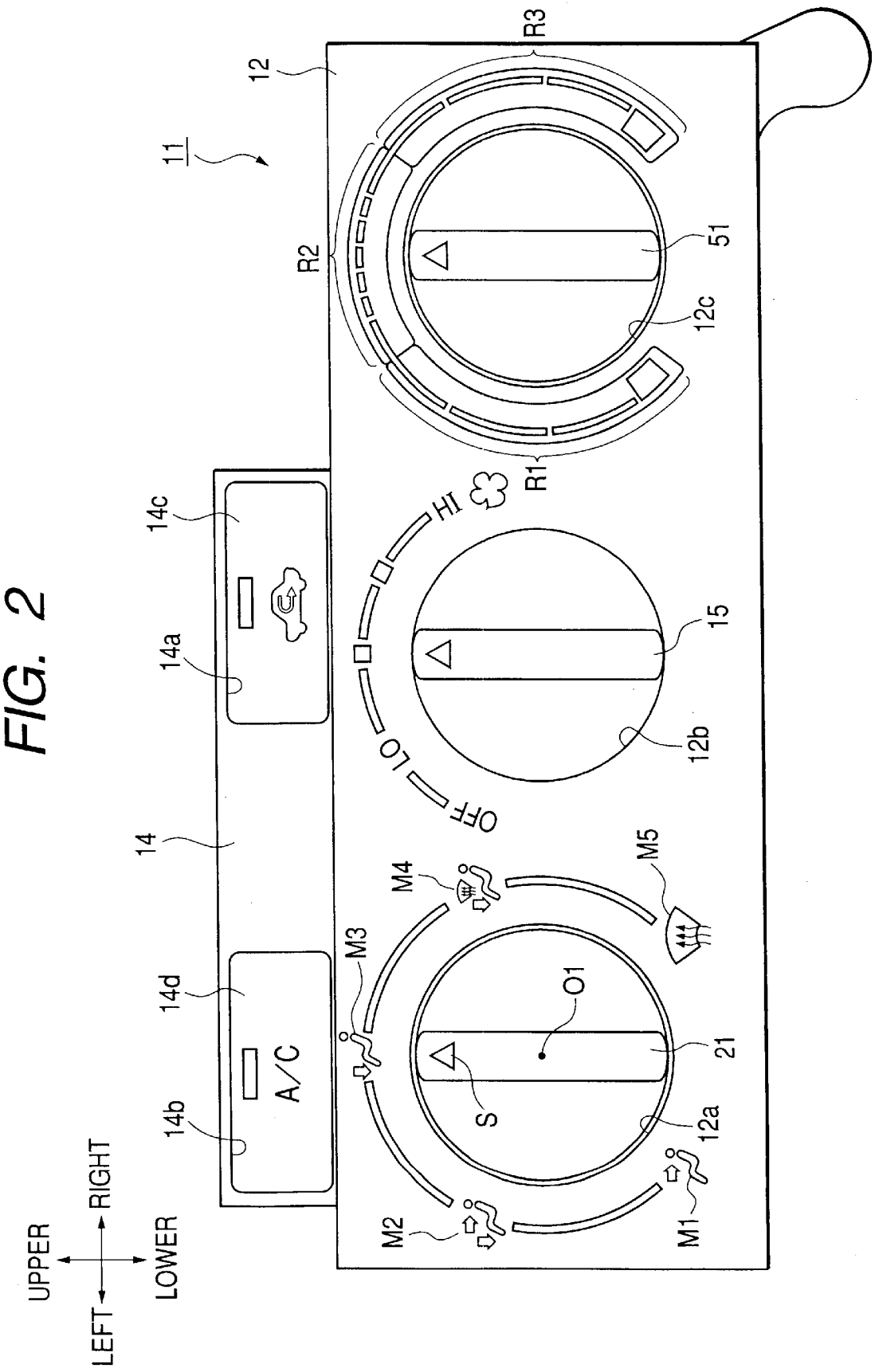
FIG. 2 is a front view of the controller unit in the embodiment.

In this embodiment, the right side, the left side, the upper side and the lower side in FIG. 2 are defined as the right side, the left side, the upper side and the lower side, respectively, and further this side and the inner side with respect to the drawing sheet in FIG. 2 are defined as the front side and the rear side, respectively.

Figure 1:
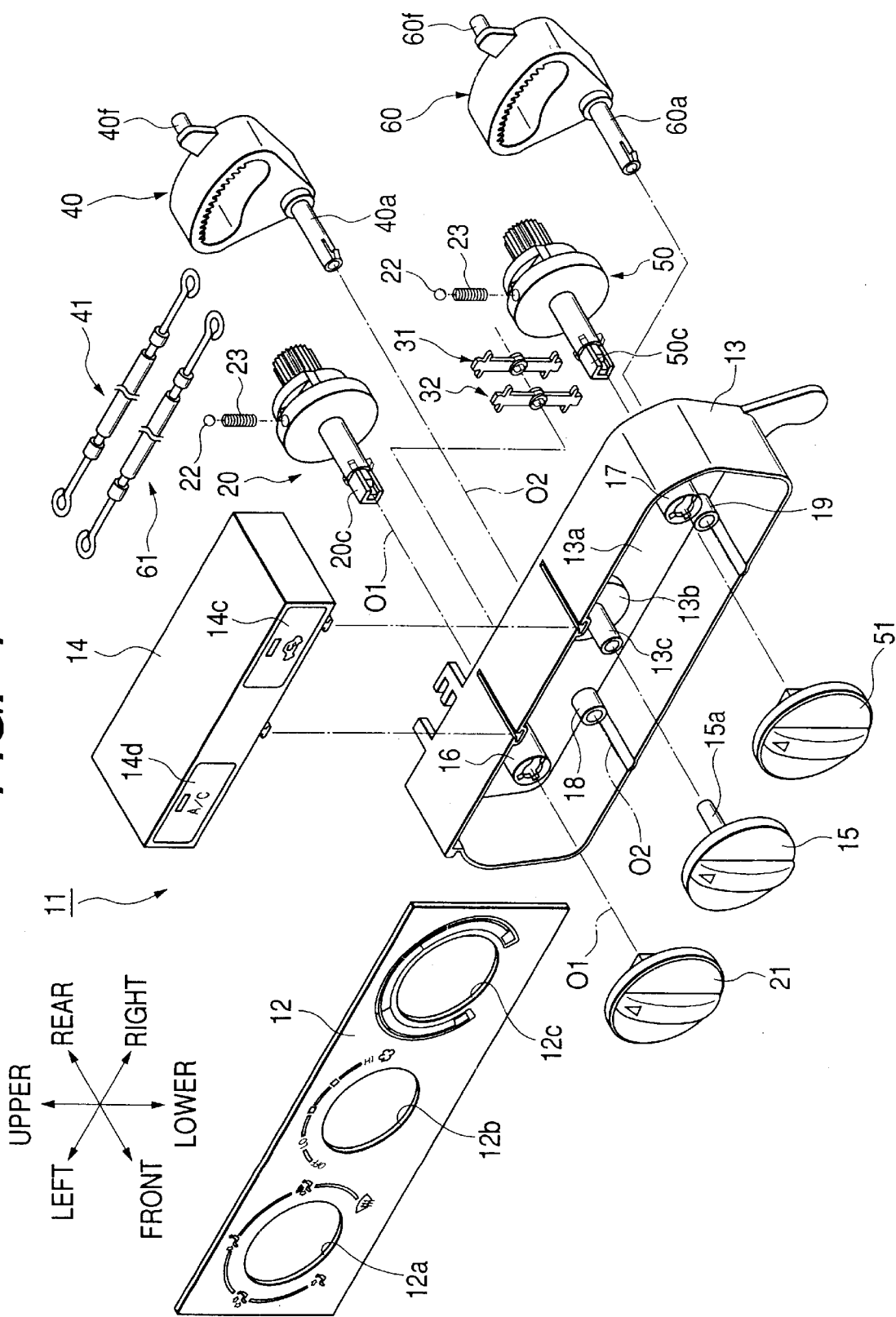
FIG. 1 is an exploded perspective view of a controller unit in an embodiment.

FIG. 1 shows an exploded perspective view of an operation switch unit for a vehicle (hereinafter called a controller unit) 11 according to the embodiment. The controller unit 11 includes a design plate 12, a main case body 13 and a switch box 14.

The main case body 13 is configured in an almost box shape having an opened front side surface and is fixed to a not-shown fixing member within a not-shown instrument panel of a vehicle.

Figure 3:
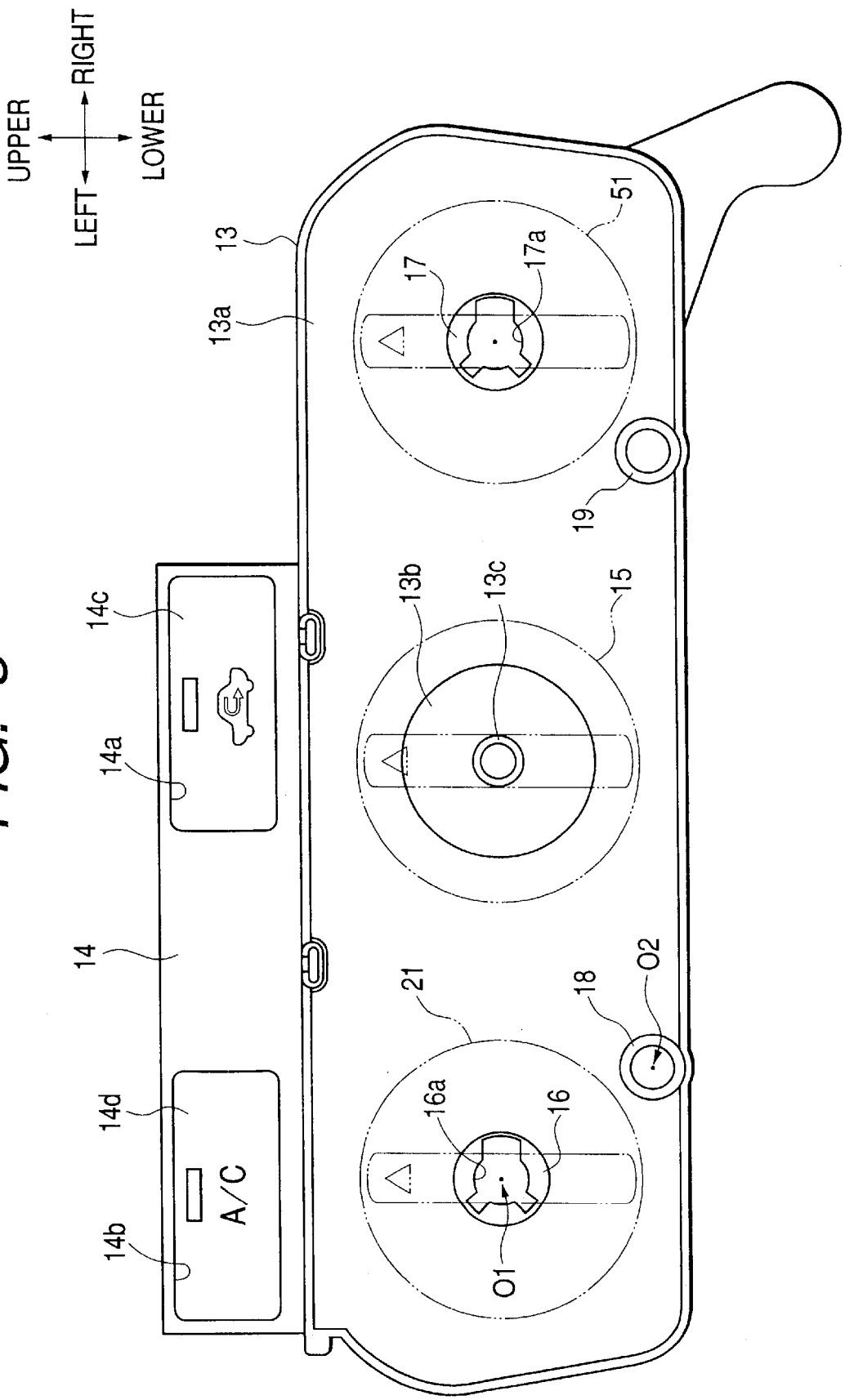
FIG. 3 is a front view of the controller unit except for a design plate in the embodiment.

As shown in FIGS. 1 and 3, in a side wall 13a at the rear side of the main case body 13, a cylindrical housing portion 13b with a lid is formed in such a manner that the almost center portion thereof projects forward. A supporting tube 13c is formed at the center portion of the housing portion 13b. The shaft portion 15a of a rotatable knob 15 is inserted into the supporting tube 13c, and the shaft portion 15a is interlocked with a not-shown rotation switching device disposed within the housing portion 13b. The knob 15 is one for changing an air flow rate. The rotation switching device is arranged to output an electric signal according to the rotation position of the knob 15 to other devices other than the controller unit 11.

In the side wall 13a of the main case body 13, cylindrical housing portions 16, 17 with lids projecting forward are formed at the left and right sides of the housing portion 13b, and engagement holes 16a, 17a are formed at the tip end portions of the housing portions, respectively. As shown in FIGS. 1, 3, 4 and 5B, in the side wall 13a of the main case body 13, guide tubes 18, 19 projecting forward and backward with respect to the side wall 13a are formed at almost right below direction of the housing portion 16 and at almost left below direction of the housing portion 17, respectively. The shaft portion 20a of a rotary body 20 is inserted into the engagement hole 16a.

As shown in FIG. 5B, three projection pieces 20b are formed at the outer periphery of the tip end portion of the shaft portion 20a, and one of the projection pieces 20b is made larger than the remaining two of the projection pieces 20b. In contrast, as shown in FIGS. 1 and 3, the engagement hole 16a of the housing portion 16 has the same shape as the sectional shape of the shaft portion 20a having the projection pieces 20b and is arranged so as to be able to insert the shaft portion 20a therein. The engagement hole 17a of the housing portion 17 has the same shape as the engagement hole 16a.

Accordingly, when the shaft portion 20a of the rotary body 20 is inserted into the engagement hole 16a, the shaft portion 20a is inserted while making the shape of the engagement hole 16a correspond to the sectional shape of the tip end portion of the shaft portion 20a. The position of the rotary body 20, that is, the position where these shapes are corresponding to each other and are called an insertion position. Thereafter, when the rotary body 20 is rotated around the shaft center O1 of the housing portion 16, the rotary body 20 and the main case body 13 are made engaged except for the insertion position so as not be able to come out. The shaft center O1 corresponds to a rotary shaft center and to a first rotary shaft center.

As shown in FIGS. 5A to 5B, a quadrangle tubular attachment portion 20c is formed at the tip end portion of the shaft portion 20a, and an engagement nail 20d is formed at the one side wall of the attachment portion 20c. A knob 21 as a rotatable operation knob having a quadrangle tubular engagement portion 21a (see FIG. 11) is fitted to the rear portion of the attachment portion 20c of the rotary body 20.

On the other hand, a disk portion 20e is formed at the rear end portion of the shaft portion 20a of the rotary body 20, and a housing hole 20f extending axially is formed at the outer peripheral surface of the disk portion 20e. A moderation ball 22 is housed within the housing hole 20f of the rotary body 20 so as to be able to rise and set, and a spring 23 for urging the ball outward is housed in the housing hole.

Figure 4:
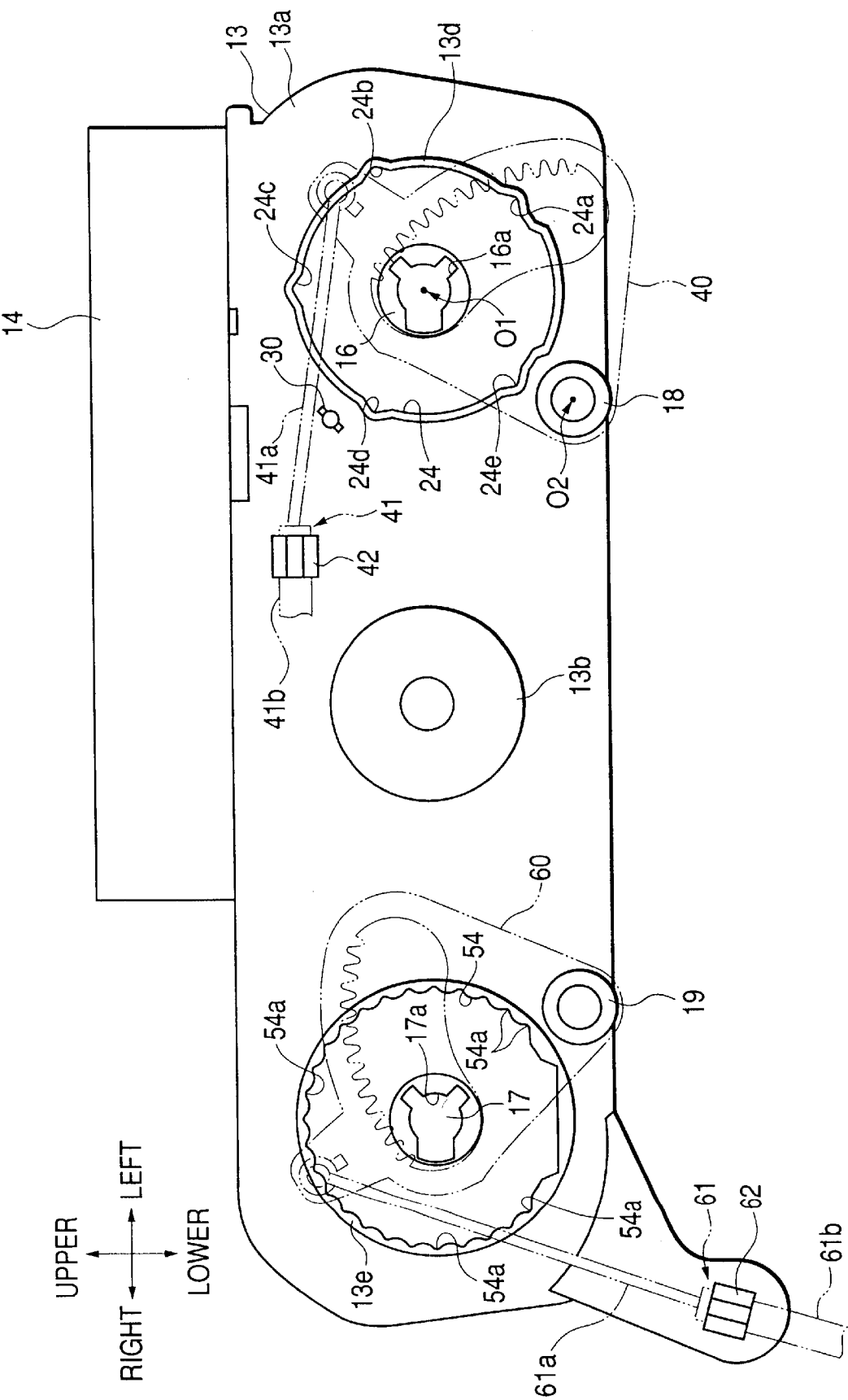
FIG. 4 is a rear view of a main case body in the embodiment.
Figure 5:
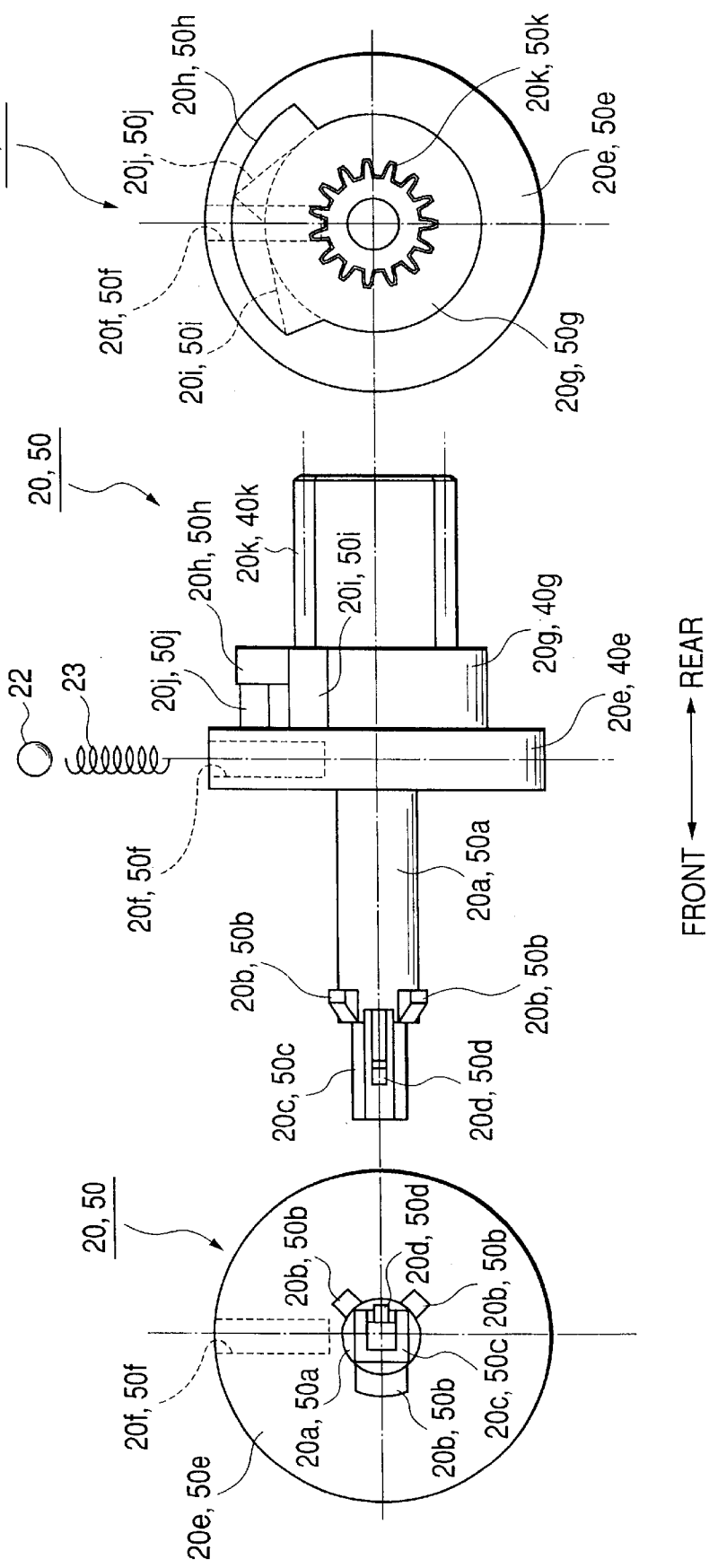
FIG. 5A is a front view of a rotary body.
FIG. 5B is a side view of the rotary body.
FIG. 5C is a rear view of the rotary body.
Figure 6:
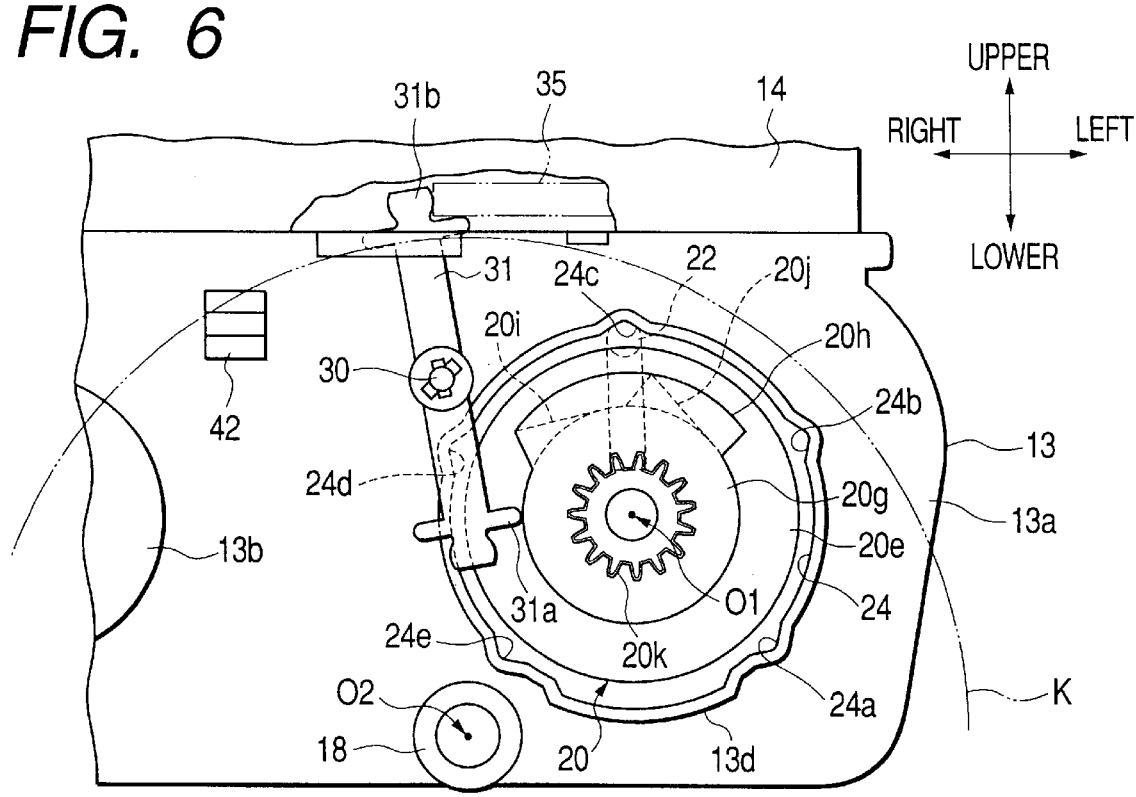
FIG. 6 is a diagram for explaining the relation between cams and a detection switch in the embodiment.
Figure 7:
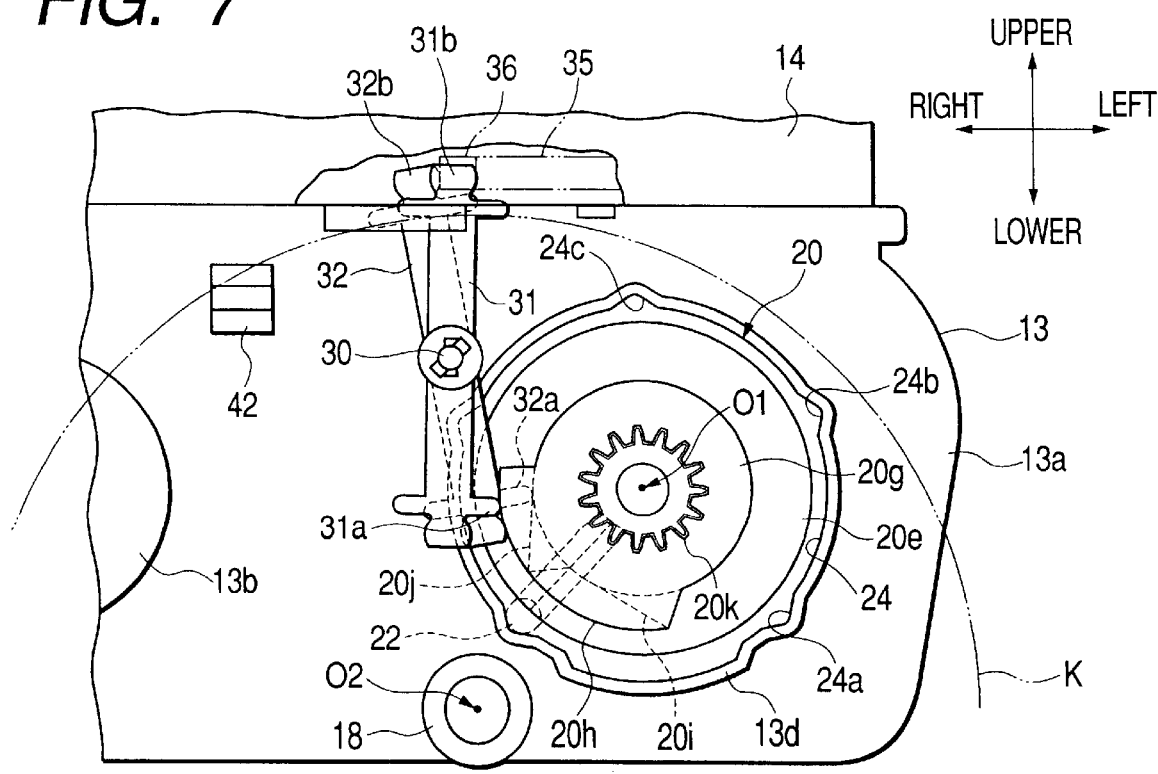
FIG. 7 is a diagram for explaining the relation between cams, the detection switch and an interlock member in the embodiment.

As shown in FIGS. 4, 6 and 7, in the side wall 13a of the main case body 13, a portion of the main case body 13 corresponding to the outer peripheral portion of the disk portion 20e of the rotary body 20 is formed in such a manner that a substantially cylindrical moderation wall portion 13d of the main case body 13 projects backward. The disk portion 20e of the rotary body 20 is housed within the moderation wall portion 13d. The inner peripheral surface of the moderation wall portion 13d is formed as a moderation surface 24. Five moderation concave portions 24a to 24e are formed at the moderation surface 24 with a substantially same interval.

The moderation ball 22 is urged by the spring 23 and so always made contact with pressure to the moderation surface 24 and selectively engaged with the moderation concave portions 24a to 24e.

As shown in FIGS. 5A to 5C, in the disk portion 20e of the rotary body 20, a low column-shaped cam forming portion 20g is formed so as to be coaxial with the rotary body 20 at the rear surface opposite to the surface from which the shaft portion projects. On the peripheral surface of the cam forming portion 20g, an arc-shaped cam 20h as a first cam is formed at the rear side thereof and two triangular cams 20i, 20j as second cams are formed at the front side thereof along the peripheral direction thereof. A pinion portion 20k as a pinion is formed so as to be coaxial with the rotary body 20 at the rear end portion of the cam forming portion 20g of the rotary body 20.

As shown in FIGS. 4, 6, 7 and 12, in the side wall 13a of the main case body 13, a supporting shaft 30 is formed so as to protrude backward at a portion of the outer periphery of the disk portion 20e at the right upper direction of the shaft center O1. The substantially center portions of two cam driving force transmission rods 31, 32 are supported by the supporting shaft 30 so as not to be able to be inserted therein and removed therefrom, and the cam driving force transmission rods 31, 32 can swing. The cam driving force transmission rod 31 and the cam driving force transmission rod 32 are disposed so as to correspond to the cam 20h and the cams 20i, 20j, respectively.

As shown in FIGS. 6, 7, 9A and 9B, cam abutment portions 31a, 32a are formed at the left side surface near the lower end portion of the cam driving force transmission rods 31, 32 so as to protrude in the left direction, respectively. The cam abutment portion 31a is able to abut against the cam 20h, and the cam abutment portion 32a is able to abut against the cams 20i, 20j. Pressing portions 31b, 32b at the upper ends of the cam driving force transmission rods 31, 32 are formed so as to protrude upward from the outer frame of the main case body 13, respectively.

As shown in FIGS. 1 and 2, the switch box 14 is fixed to the upper portion of the main case body 13. Operation openings 14a, 14b are formed through the right side and the left side of the front side surface of the switch box 14, respectively. An operation button 14c for switching between the inner and external air and an operation button 14d for an air conditioner are disposed at the operation openings 14a, 14b, respectively. The operation button 14c corresponds to a second switch and an operated member.

The operation button 14c is arranged so as to turn on a switching element (not shown) provided at a not-shown circuit board to operate an actuator for operating a damper for switching between the inner air and the external air thereby to change from an external air introduction mode to the inner air circulation mode when the operation button is operated.

The operation button 14c is held at a pushed position by a pressing and holding mechanism (not shown) provided within the switch box 14. The pressing and holding mechanism is constituted by a known mechanism in such a manner that when the operation button 14c is pushed again, the holding state thereof is released and restored by a not-shown restoring spring. When the operation button 14c is released from the holding state at the pushed position, this operation button turns off the switching element (not shown) provided at the not-shown circuit board to operate the actuator for operating the damper for switching between the inner air and the external air thereby to change from the inner air circulation mode to the external air introduction mode.

The operation button 14d also includes, like the operation button 14c, a not-shown circuit board, a switching element, a damper, an actuator, a pressing and holding mechanism and a restoring spring. When the operation button 14d is pressed and held at a pushed position, the switching element (not shown) provided at the not-shown circuit board is turned on thereby to operate the air conditioner.

As shown in FIGS. 6, 7, 8A and 8B, the pressing portions 31b, 32b of the cam driving force transmission rods 31, 32 are disposed within the switch box 14 so as to be able to swing. A detecting switch 35 as a first switch and an interlock member 36 as an operated member are provided at the left sides of the pressing portions 31b, 32b within the switch box 14, respectively. Each of the detecting switch 35 and the interlock member 36 is movable in the left and right directions.

The detecting switch 35 and the interlock member 36 are always urged toward the right side by not-shown springs to press the cam abutment portions 31a, 32a of the cam driving force transmission rods 31, 32 to the right side, respectively. Thus, the cam abutment portions 31a, 32a of the cam driving force transmission rods 31, 32 are always made contact with pressure to the peripheral surface of the disk portion 20e or the cam 20h, and the cam abutment portion 32a of the cam driving force transmission rod 32 is always made contact with pressure to one of the peripheral surface of the disk portion 20e, the cam 20i and the cam 20j.

Figure 8A:
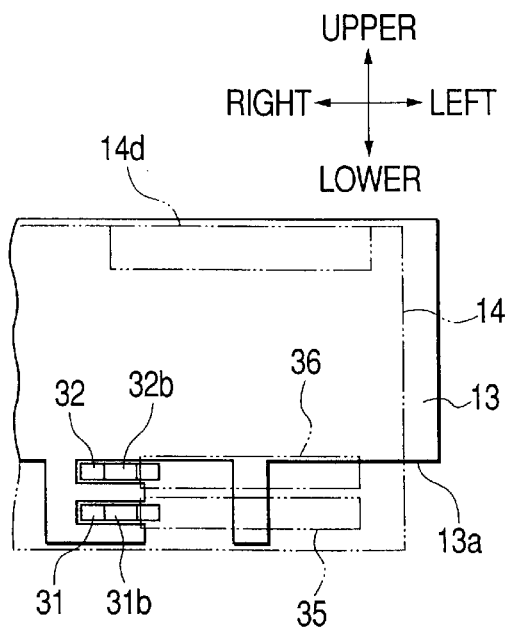
FIGS. 8A and 8B are diagrams for explaining the relation between cam driving force transmission rods, the detection switch and the interlock member in the embodiment.
Figure 8B:
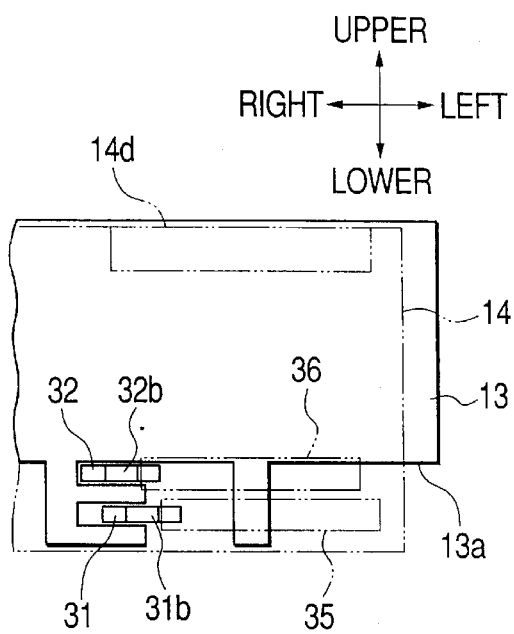
Figure 9A:
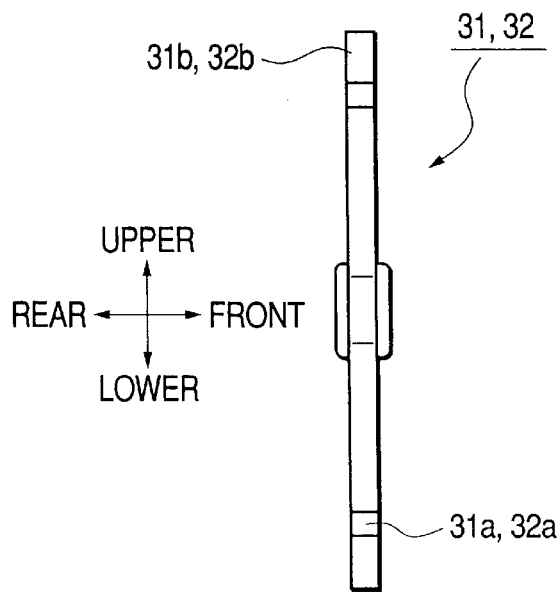
FIG. 9A is a side view of the cam driving force transmission rod.
Figure 9B:
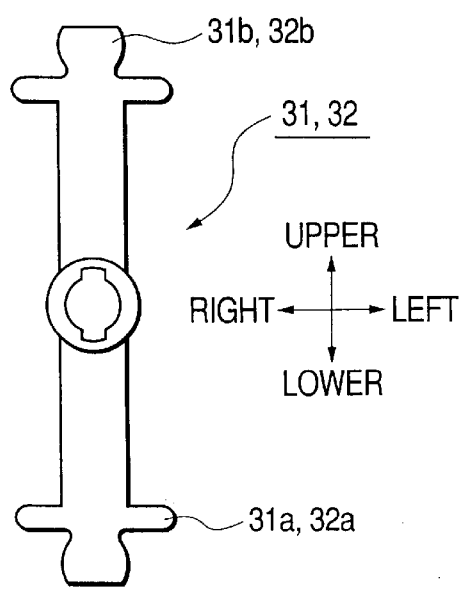
FIG. 9B is a rearview of the cam driving force transmission rod.

As shown in FIGS. 7 and 8B, when the cam abutment portion 31a of the cam driving force transmission rod 31 abuts against the cam 20h of the cam forming portion 20g, the detecting switch 35 is pressed and operated by the pressing portion 31b of the cam driving force transmission rod 31 and moves to the left side. Then, the detecting switch 35 is turned on and an electric signal according to the turning-on of the detection switch is outputted to other devices (not shown) other than the controller unit 11. Then, the defogging operation is performed by the other devices.

When the cam abutment portion 32a of the cam driving force transmission rod 32 abuts against the cam 20i or the 20j of the cam forming portion 20g, the interlock member 36 is pushed by the pressing portion 32b of the cam driving force transmission rod 32 and moves to the left side (that is, the position of the left side like the detecting switch 35 shown in FIG. 8B). Then, the interlock member 36 applies the following action with respect to the operation button 14c. That is, when the operation button 14c holds its pushed position, this pushed-position holding state of the operation button 14c is cancelled, and the operation button 14c is forced to restore its position to the forward direction. As a result, a switch element (not shown) provided at the not-shown circuit board is turned off to operate the actuator for operating the damper for switching between the inner air and the external air thereby to change from the inner air circulation mode to the external air introduction mode.

Figure 10:
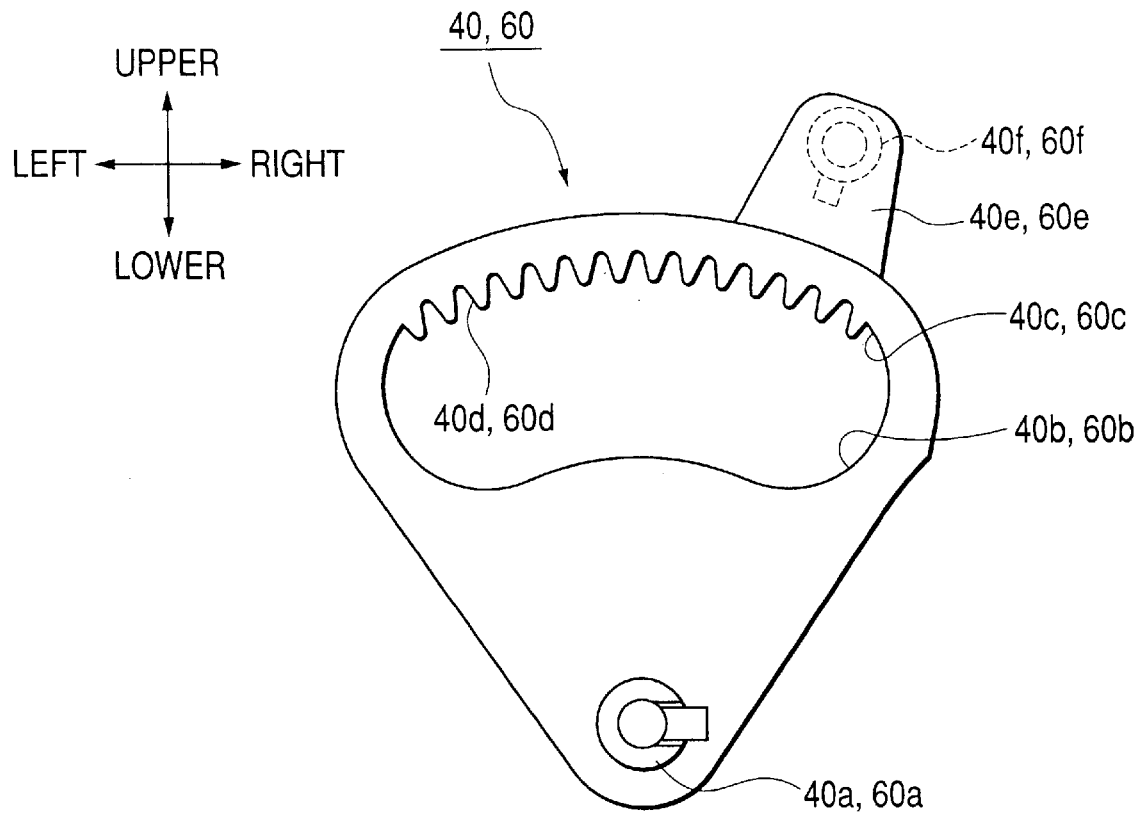
FIG. 10 is a front view of a cable operation member in the embodiment.
Figure 11:
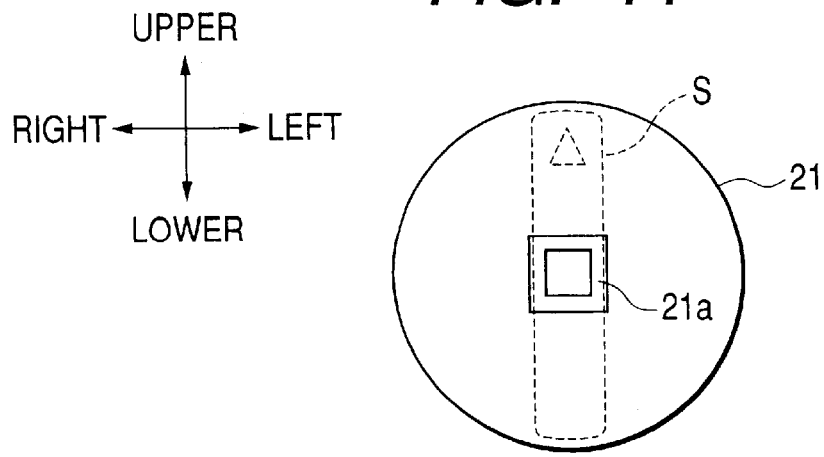
FIG. 11 is a rear view of a knob in the embodiment.
Figure 12:
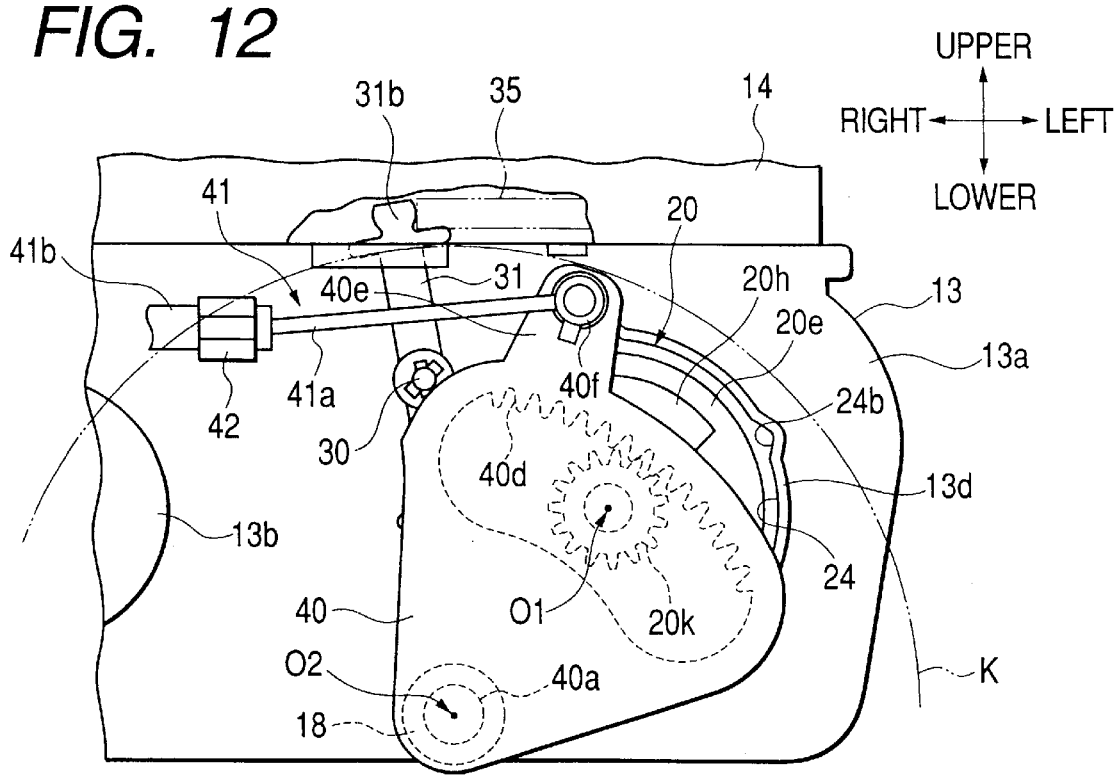
FIG. 12 is a diagram for explaining the relation between the rotary body and the cable operation member in the embodiment.
Figure 13:
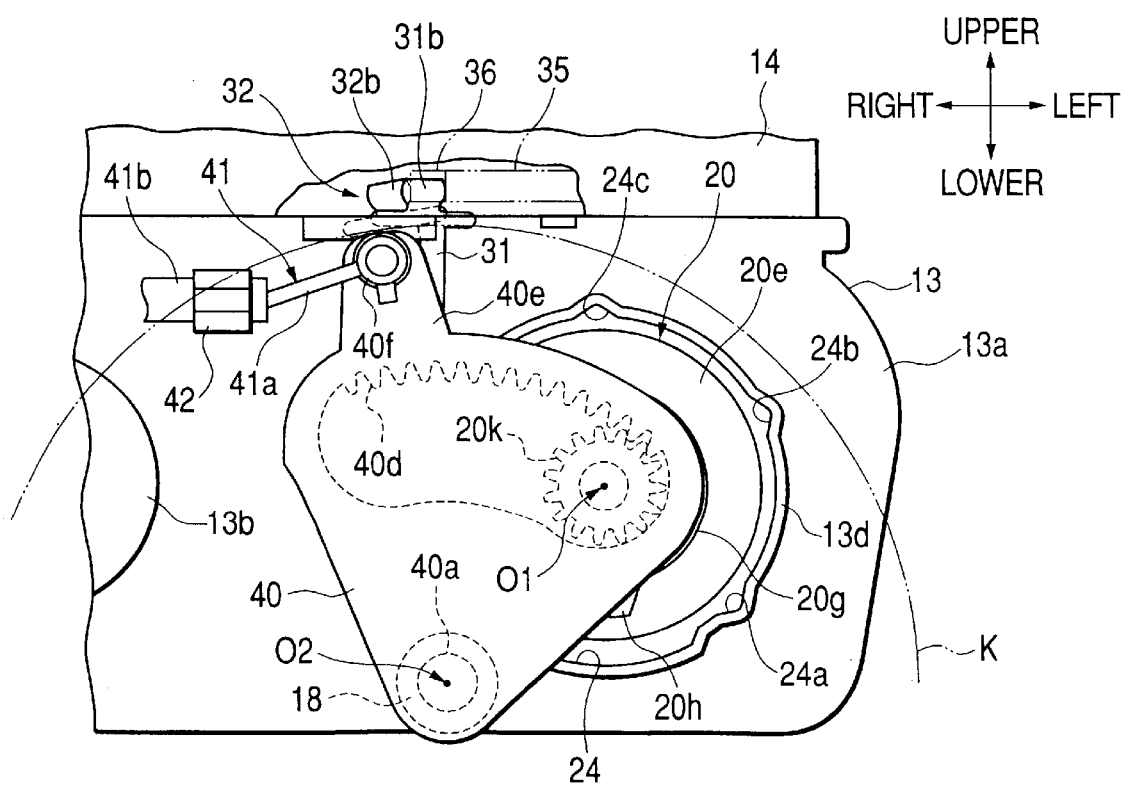
FIG. 13 is a diagram for explaining the relation between the rotary body and the cable operation member in the embodiment.
Figure 14:
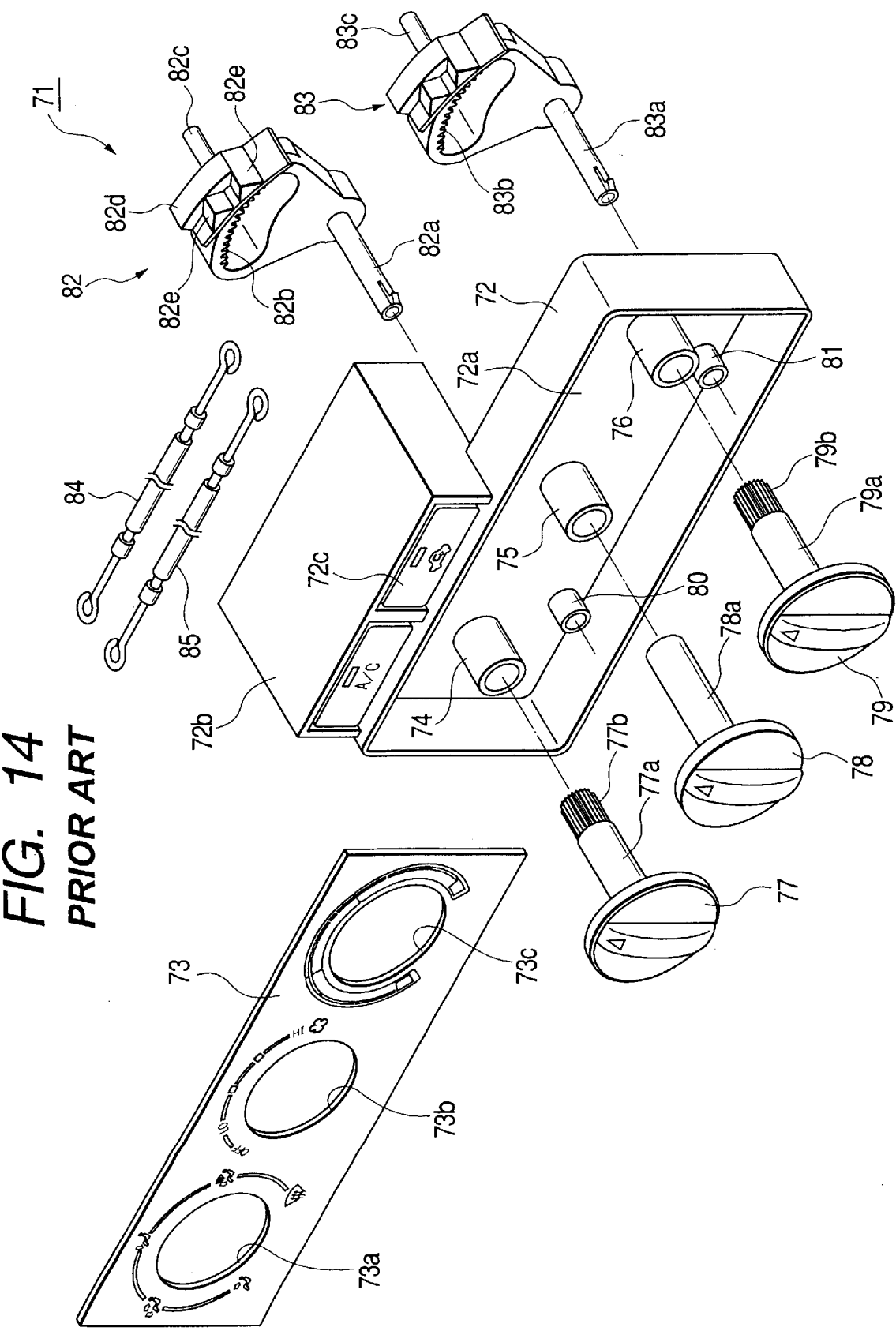
FIG. 14 is an exploded perspective view of a controller unit in a related technique.
Figure 15:
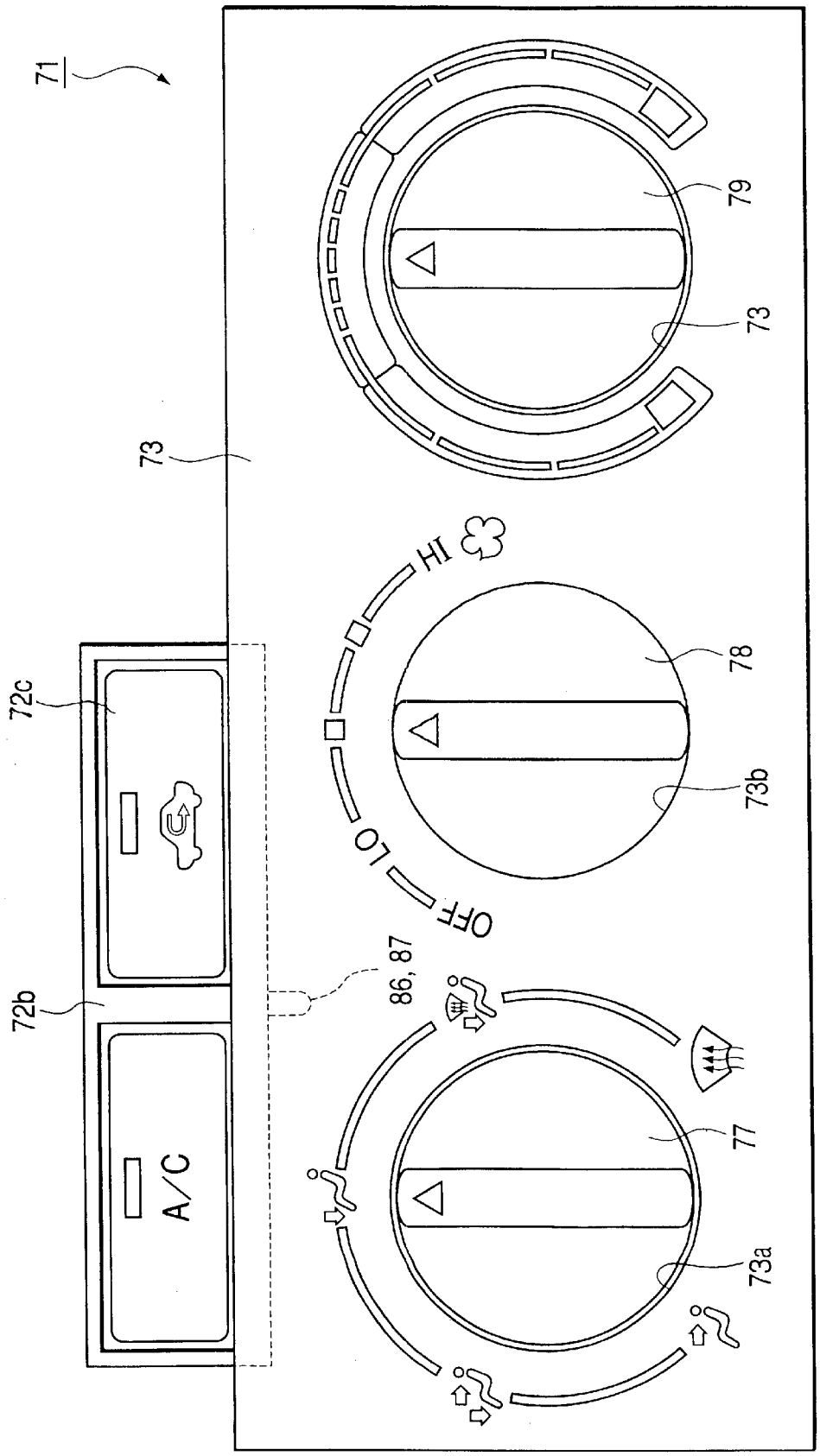
FIG. 15 is a front view of the controller unit in the related technique.
Figure 16B:
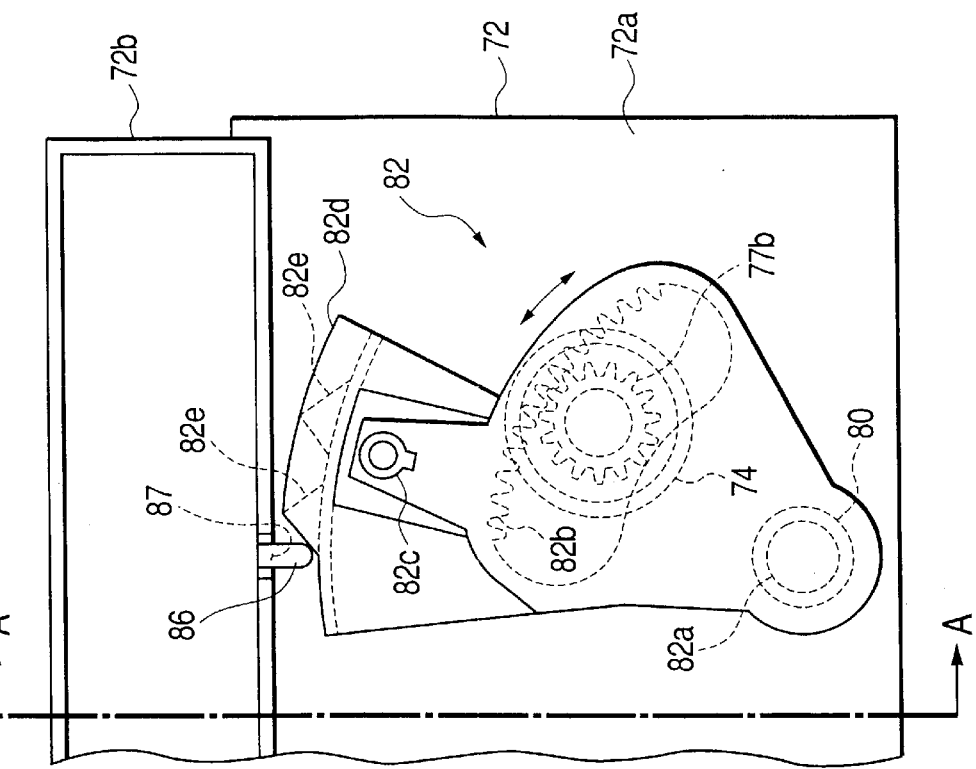
FIG. 16B is a diagram for explaining the relation between a cam and a forward and backward moving member.
Figure 16A:
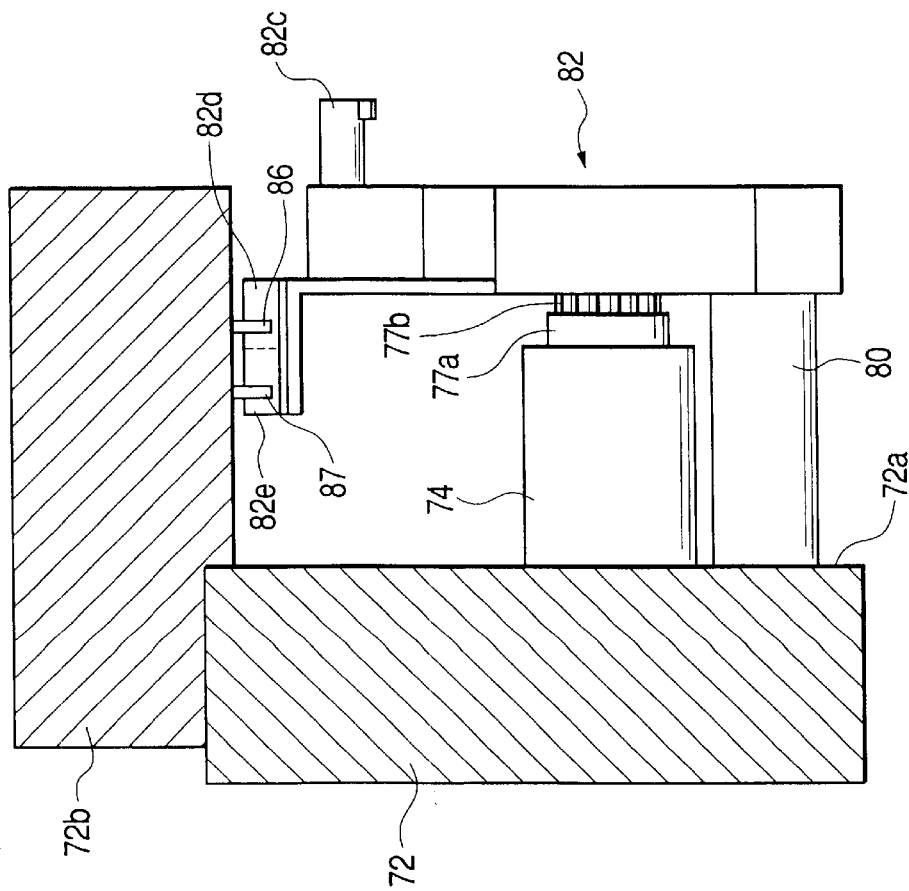
FIG. 16A is a sectional view along a line A—A in FIG. 16B.

As shown in FIGS. 10, 12 and 13, a cable operation member 40 is pivotally provided at the guide tube 18. The cable operation member 40 is formed in a fan shape and a pivot shaft 40a is formed at a pivot portion on the lower end side thereof. The pivot shaft 40a is inserted within the guide tube 18 so as to be able to swing freely and not to be able to be inserted therein and removable therefrom.

An engagement insertion groove 40b formed in a concave manner along a fan shape is formed at the front surface of the upper end of the cable operation member 40. An arc-shaped surface 40c coaxial with the shaft center O2 of the guide tube 18 is formed at the engagement insertion groove 40b, and a sector gear 40d meshing with the pinion portion 20k of the rotary body 20 is formed at the arc-shaped surface 40c. The shaft center O2 corresponds to a second rotary shaft center. The sector gear 40d is a sector internal gear which tooth top is disposed at the inside of the tooth bottom surface thereof.

An extended portion 40e is formed at the cable operation member 40 so as to extend outward of the sector portion, and a cable interlock pin 40f (not shown) protruding backward is provided at the extended portion 40e.

The driving force transmission cable 41 includes an inner cable 41a and an outer cable 41b within which the inner cable 41a is inserted. The inner cable 41a of a driving force transmission cable 41 is coupled to the cable interlock pin 40f. The outer cable 41b of the driving force transmission cable 41 is held between a pair of adhesively holding pieces of a cable holding portion 42 provided at the rear side surface of the side wall 13a of the main case body 13 and fixed to the adhesively sandwiching pieces. The inner cable 41a is slidable within the outer cable 41b in accordance with the rotation amount of a knob 21.

As shown in FIGS. 6, 7, 12 and 13, when the cable operation member 40 is rotated around the shaft center O2, a circle drawn by a portion of the cable operation member 40 (the end portion of the extended portion 40e) most away from the shaft center O2 is supposed to be a virtual circle K. In this case, the cams 20h to 20j of the rotary body 20 are disposed within the virtual circle K.

As shown in FIG. 1, the shaft portion 50a of a rotary body 50 is inserted within the engagement hole 17a of the housing portion 17. The rotary body 50 is configured to have the shape similar to the rotary body 20. Thus, the explanation of the shapes of the respective portions of the rotary body 50 is omitted, and the respective portions of the rotary body 50 are attached with reference numerals of fifties where the single digits thereof are common to those of the respective portions of the rotary body 20 (see FIGS. 5A to 5C).

The cam forming portion 50g and the cams 50h to 50j of the rotary body 50 have the similar shapes to the cam forming portion 20g and the cams 20h to 20j of the rotary body 20, respectively. However, the cam forming portion 50g and the cams 50h to 50j are not used actually and serve as if they are mere ornaments. This is because, in brief, rather than preparing the rotary body 20 having none of the cam forming portion 20g and the cams 20h to 20j as the rotary body 50, it will be made lower in manufacturing cost when preparing the rotary body 50 having the same configuration as the rotary body 20.

As shown in FIG. 1, the knob 51 is fixed to the attachment portion 50c of the rotary body 50, and the moderation ball 22 and the spring 23 are housed within the housing hole 50f of the rotary body 50.

In the side wall 13a of the main case body 13, at a portion of the side wall corresponding to the outer peripheral portion of the disk portion 50e of the rotary body 50, a substantially cylindrical potion 13e (see FIG. 4) is formed so as to protrude backward, and the disk portion 50e of the rotary body 50 is housed within the moderation wall portion 13e. As shown in FIG. 4, the inner peripheral surface of the moderation wall portion 13e is formed as a moderation surface 54, and a plurality of moderation concave portions 54a are formed at the moderation surface 54. The moderation ball 22 within the housing hole 50f is always made contact with pressure to the moderation surface 54 by the urging force of the spring 23 and is made selectively engage with the moderation concave portions 54a.

A cable operation member 60 is provided at the guide tube 19 so as to be able to swing freely. The cable operation member 60 has the similar shape to the cable operation member 40 (see FIG. 10). Thus, the explanation of the shapes of the respective portions of the cable operation member 60 is omitted, and the respective portions of the cable operation member 60 are attached with reference numerals of sixties where the single digits thereof are common to those of the respective portions of the cable operation member 40.

The sector gear 60d of the cable operation member 60 is engaged with the pinion portion 50k of the rotary body 50, and the inner cable 61a of a driving force transmission cable 61 is coupled to the cable interlock pin 60f of the cable operation member 60. The driving force transmission cable 61 includes the inner cable 61a and an outer cable 61b within which the inner cable 61a is inserted.

The outer cable 61b of the driving force transmission cable 61 is held between a pair of adhesively holding pieces of a cable holding portion 62 provided at the rear side surface of the side wall 13a of the main case body 13 and fixed to the adhesively sandwiching pieces. The inner cable 61a is made slidable within the outer cable 61b in accordance with the rotation amount of a knob 51.

As shown in FIGS. 1 and 2, the design plate 12 is fixed to the front portion of the main case body 13. The design plate 12 is provided with three knob attachment holes 12a, 12b, 12c so as to be aligned in the left and right direction. The knobs 21, 15, 51 are disposed at the knob attachment holes 12a to 12c, respectively.

As shown in FIG. 2, a plurality of marks M1 to M5 representing the air blowing positions are described at the opening periphery of the knob attachment hole 12a in the design plate 12. In the design plate 12, the marks M1 to M5 are provided clockwise with an almost same interval from an almost left below portion to an almost right below portion with reference to the shaft center O1.

Each mode represented by the marks M1 to M3 is an un-defrosting mode not performing the defrosting control. The modes shown by the marks M1 to M3 represent a "face" mode for blowing air to the face of a driver etc., a "bi-level" mode for blowing air to the face and the feet, and a "foot" mode for blowing air to the feet, respectively.

Each mode represented by the marks M4 and M5 is a defrosting mode for performing the defrosting control. The modes shown by the marks M4 and M5 represent a "foot/defrosting" mode for defrosting the windows such as a front glass etc. and blowing air to the feet, and a "defrosting" mode for defrosting the windows such as the front glass etc, respectively.

A plurality of marks (OFF, LO, HI etc.) representing blowing rates of the air are described at the opening periphery of the knob attachment hole 12b in the design plate 12.

Further, marks R1 to R3 (a low temperature area, a middle temperature area, a high temperature area) representing temperature areas of the conditioned air are described at the opening periphery of the knob attachment hole 12c in the design plate 12.

An indication mark S is described at the knob 21, and the knob 21 is rotatable within a range where the indication mark S points the marks M1 to M5.

Then, the operation relation of other members at the time of operating the knob 21 will be explained.

When the knob 21 is rotated forwardly and reversely, the rotary body 20 is rotated forwardly and reversely in accordance with the forward and reverse rotation of the knob 21. At this time, when the indication mark S of the knob 21 opposes to the marks M1 to M5, the moderation ball 22 is engaged with moderation concave portions 24a to 24e, respectively.

When the indication mark S of the knob 21 moves over the mark M3 and positioned in a range to the mark M5 over the mark M3, the cam abutment portion 31a of the cam driving force transmission rod 31 abuts against the cam 20h of the cam forming portion 20g. Then, the pressing portion 31b of the cam driving force transmission rod 31 pushes the detecting switch 35 to the left side to turn on the detecting switch 35 thereby to output the electric signal according to the turning-on of the detection switch to the other devices (not shown) other than the controller unit 11. Then, the defogging operation is performed by the other devices.

In this embodiment, the expression "over the mark M3" does not include the position of the mark M3, and the expression "to the mark M5" includes the position of the mark M5.

In contrast, when the indication mark S of the knob 21 is positioned in a range from the mark M1 to the mark M3, the pressing portion 31b of the cam driving force transmission rod 31 is positioned to the right side by the detecting switch 35 urged by the spring (not shown) Thus, the cam abutment portion 31a of the cam driving force transmission rod 31 abuts against the cam forming portion 20g. In this state, the detecting switch 35 is made turned off and the defogging operation by the other devices (not shown) other than the controller unit 11 is not performed.

In this embodiment, the expression "from the mark M1" includes the position of the mark M1.

Further, when the indication mark S of the knob 21 moves within a section between the mark M3 and the mark M4 and a section between the mark M4 and the mark M5, the following action is performed.

When the indication mark S moves within the section between the mark M3 and the mark M4, the cam 20i of the rotary body 20 temporarily pushes the cam abutment portion 32a of the cam driving force transmission rod 32. In contrast, when the indication mark S moves within the section between the mark M4 and the mark M5, the cam 20j of the rotary body 20 temporarily pushes the cam abutment portion 32a of the cam driving force transmission rod 32.

When the cam 20i or 20j temporarily pushes the cam abutment portion 32a of the cam driving force transmission rod 32, the pressing portion 32b of the cam driving force transmission rod 32 temporarily pushes the portion 36 to the left side. Then, only in the case where the operation button 14c holds its pushed position, the interlock member 36 releases or cancels the holding state of the pushed position of the operation button 14c thereby to restore the operation button 14c to the forward position.

As a result, only in the case of the external air introduction mode, the switch element (not shown) is turned off and the actuator is operated for operating the damper for switching between the inner air and the external air thereby to change from the inner air circulation mode to the external air introduction mode. When the external air is taken within the vehicle in this manner, the efficiency of the defogging control can be improved.

Further, when the knob 21 is rotated forwardly and reversely, the pinion portion 20k of the rotary body 20 is rotated in accordance with the forward and reverse rotation of the knob 21. Then, the cable operation member 40 reciprocally swings in accordance with the forward and reverse rotation of the knob 21 due to the meshing operation between the pinion portion 20k and the sector gear 40d. Then, the forward and backward movement length of the inner cable 41a of the driving force transmission cable 41 is set to a predetermined length in accordance with the reciprocal swinging operation of the cable operation member 40.

In this manner, the forward and backward movement length of the inner cable 41a in accordance with the rotation position of the knob 21 is mechanically transmitted to the not-shown other devices and the processing according to the marks M1 to M5 is performed.

Then, the operation relation of other members at the time of operating the knob 15 will be explained.

When the knob 15 is rotated to indicate OFF, LO or HI etc., an electric signal according to the indicated OFF, LO or HI etc. is outputted to the other devices (not shown) other than the controller unit 11 from the not-shown rotation switching device disposed within the housing portion 13b.

Then, the operation relation of other members at the time of operating the knob 51 will be explained.

When the knob 51 is rotated forwardly and reversely, the rotary body 50 is rotated forwardly and reversely in accordance with the forward and reverse rotation of the knob 51. In this case, the moderation ball 22 within the housing hole 50f is engaged with the moderation concave portion 54a of the moderation surface 54 in accordance with the rotation amount of the knob 51, so that the moderation feeling can be obtained from the knob 51.

Further, when the knob 51 is rotated forwardly and reversely, the pinion portion 50k of the rotary body 50 is rotated forwardly and reversely in accordance with the forward and reverse rotation of the knob 51, so that the cable operation member 60 having the sector gear 60d meshed with the potion 50k swings reciprocally. Then, the forward and backward movement length of the inner cable 61a of the driving force transmission cable 61 is set to a predetermined length in accordance with the reciprocal swinging operation of the cable operation member 60. The forward and backward movement length of the inner cable is mechanically transmitted to the other devices (not shown) other than the controller unit 11 and the processing according to the marks R1 to R3 is performed.

Next, the effects of the controller unit 11 according to the embodiment will be explained.

(1) In this embodiment, a cam is not provided at the cable operation member 40. When the cable operation member 40 is rotated around the shaft center O2, a circle drawn by the portion of the cable operation member 40 most away from the shaft center O2 is supposed to be the virtual circle K. In this case, the cams 20h to 20j provided at the rotary body 20 are disposed within the virtual circle K. Thus, unlike the general technique, the movable space of the cable operation member 40 becomes smaller as compared with the case where the cams 82d, 82e are provided so as to be positioned above the cable attachment portion 82c of the cable operation member 82.

Accordingly, since the cams 20h to 20j are not provided at the portion of the outside of the outer frame most away from the shaft center O2 in the cable operation member 40, the movable space of the cable operation member 40 can be made smaller. As a result, the controller unit 11 can be made smaller.

(2) In this embodiment, the cam 20h of the rotary body 20 pushes the detecting switch 35 through the cam driving force transmission rod 31 thereby to turn on and off the detecting switch 35. The not-shown other devices other than the controller unit 11 performs the defogging control operation in accordance with the turning-on and off operation of the detecting switch 35. Accordingly, the defogging setting operation of the window glass of a vehicle can be performed by using the cam 20h of the rotary body 20.

(3) In this embodiment, the cams 20i, 20j of the rotary body 20 pushes the interlock member 36 through the cam driving force transmission rod 32. Then, only in the case where the operation button 14c holds its pushed position, the position of the operation button 14c is restored to the forward position. Then, when the position of the operation button 14c is restored to the forward position, the operation mode is changed from the inner air circulation mode to the external air introduction mode, whereby the external air is taken within the vehicle and so the efficiency of the defogging control can be improved. Thus, the operation mode can be changed from the inner air circulation mode setting state to the external air introduction mode by using the cams 20i, 20j of the rotary body 20. When the external air is taken within the vehicle in this manner, the efficiency of the defogging control can be improved.

Another Embodiment

The aforesaid embodiment maybe changed and modified into the following another embodiment.

In the aforesaid embodiment, the cams 20h to 20j are provided at the rotary body 20, and the cam abutment portions 31a, 32a of the cam driving force transmission rods 31, 32 are pushed by using the cams 20h to 20j. Further, the detecting switch 35 and the interlock member 36 are pushed and operated by using the pressing portions 31b, 32b of the cam driving force transmission rods 31, 32. The invention is not limited to such a configuration, and all of the cams 20i, 20j, the cam driving force transmission rod 32 and the interlock member 36 except for the cam 20h may be removed. When the invention is configured in this manner, although the function of canceling the inner air circulation mode is lost, the configuration of the invention can be simplified.

In the aforesaid embodiment, although the cam 20h provided at the rotary body 20 is used as a switch driving source for setting the defogging operation of the window glass of a vehicle, the cam may be used as a switch driving source (an operated member) for setting other devices. For example, the cam 20h may be used as a switch driving source (an operated member) for canceling the inner air circulation mode or a switch driving source (an operated member) for adjusting an air flow rate.

In the aforesaid embodiment, although the cams 20i, 20j provided at the rotary body 20 are used as switch driving sources for canceling the inner air circulation mode, the cams may be used as switch driving sources (operated members) for setting other devices. For example, the cams 20i, 20j may be used as switch driving sources (operated members) for setting the defogging mode of the window glass of a vehicle or switch driving sources (operated members) for adjusting an air flow rate.

As described above, according to the invention, the movable space of the first cam can be made smaller as compared with the case where the first cam is provided at the outside of the outer frame of the cable operation member, so that the size of the operation switch unit for a vehicle can be made smaller by the size of the movable space of the first cam being made smaller.

Further, the movable space of the second cam can be made smaller as compared with the case where the second cam is provided at the outside of the outer frame of the cable operation member, so that the size of the operation switch unit for a vehicle can be made smaller by the size of the movable space of the second cam being made smaller.

Further, the first switch is turned on and off by using the first cam, and hence the defogging setting operation of the window glass of a vehicle can he performed.

Further, the second cam can switch the second switch in the inner air circulation mode setting state into the external air introduction mode.

What is claimed is:

1. An operation switch unit for a vehicle comprising:

an operation knob rotatable around a first rotation shaft center;

a first cam which rotates around the first rotation shaft center, and rotates in accordance with a rotation amount of the operation knob to operate an operated member;

a pinion which rotates around the first rotation shaft center and rotates in accordance with the rotation amount of the operation knob;

a cable operation member which reciprocally swings around a second rotation shaft center which is disposed at a position different from the first rotation shaft center; and a sector gear which is provided at the cable operation member and meshes with the pinion, wherein when the cable operation member is rotated around the second rotation shaft center, a circle drawn by a portion of the cable operation member most away from the second shaft center is supposed to be a virtual circle, and the first cam is disposed within the virtual circle.

2. The operation switch unit according to claim 1 further comprising:

a second cam which rotates around the first rotation shaft center, and rotates in accordance with the rotation amount of the operation knob to operate an operated member, wherein the second cam is disposed within the virtual circle.

3. An operation switch unit according to claim 1, wherein the operated member operated by the first cam is a first switch for setting a defogging operation for a window glass of the vehicle, and the first cam is operated to turn on and off the first switch.

4. The operation switch unit according to claim 2, wherein the operated member operated by the second cam is a second switch for switching between an inner air circulation mode for circulating inner air within the vehicle and an external air introduction mode for taking external air within the vehicle, and the second cam switches the second switch in the inner air circulation mode setting state into the external air introduction mode.

\* \* \* \* \*